United States Patent [19]

Bramblett et al.

[11] Patent Number: 5,666,760
[45] Date of Patent: Sep. 16, 1997

[54] FISHING LINE LOCK

[76] Inventors: Ronald F. Bramblett, 4466 Valleyview Dr., Ashland, Ky. 41101; Clinton W. Walker, III, 1653 Cypress Ridge Dr., Greenville, Miss. 38701

[21] Appl. No.: 397,921

[22] Filed: Mar. 3, 1995

[51] Int. Cl.$^6$ ..................................... A01K 91/00
[52] U.S. Cl. ............... 43/44.83; 43/42.49; 24/908
[58] Field of Search ............... 43/44.83, 42.49, 43/42.08, 42.23; 24/908

[56] References Cited

U.S. PATENT DOCUMENTS

| 103,645 | 5/1870 | Muscroft | 43/44.83 |
|---|---|---|---|
| D. 107,418 | 12/1937 | Ganaway. | |
| D. 250,656 | 12/1978 | Raney. | |
| 745,751 | 12/1903 | Abbath | 24/908 |
| 1,248,608 | 12/1917 | Brown. | |
| 1,515,849 | 11/1924 | Eppinger | 24/908 |
| 1,713,041 | 5/1929 | Fey | 43/44.83 |
| 1,883,574 | 10/1932 | Cleeland. | |
| 2,482,721 | 9/1949 | Sigmundi. | |
| 2,756,535 | 7/1956 | Dean | 43/42.49 |
| 2,819,552 | 1/1958 | Russell | 43/42.49 |
| 3,138,840 | 6/1964 | Rich | 43/42.49 |
| 3,184,880 | 5/1965 | Ratte | 24/908 |
| 3,293,791 | 12/1966 | Hinkson | 43/42.49 |
| 3,724,034 | 4/1973 | Osano | 43/44.83 |
| 4,060,927 | 12/1977 | Haun et al.. | |
| 4,217,721 | 8/1980 | Hershberger. | |
| 4,361,977 | 12/1982 | Lawler. | |
| 5,009,025 | 4/1991 | Austad | 43/44.83 |

FOREIGN PATENT DOCUMENTS

| 1010651 | 5/1977 | Canada. |
|---|---|---|
| 690469 | 4/1953 | United Kingdom. |

Primary Examiner—Kurt Rowan
Attorney, Agent, or Firm—Richard C. Litman

[57] ABSTRACT

A fishing line lock device or line attachment device which includes a shaft with a coil member extending from the upper end of the shaft, an anchor member attached to the second end of the shaft, and a sleeve with an upper tapered end, the sleeve enveloping the shaft and coil. The sleeve is secured in position by frictional or threaded engagement between the coil and an inner surface of the sleeve. The sleeve is made from or weighted with a heavy material to cause the device to sink in water. The coil defines an axial aperture adapted to receive a portion of fishing line which is wound into engagement therewith. In a preferred embodiment, the anchor member includes a ring member extending from the second end of the shaft. The ring also serves as an attachment point for standard straight line lures. In an alternative embodiment, the ring is replaced by first and second wire members which extend from the second end of the shaft. Any number of fishing lures may be integrally attached to the end portions of the first and second wire members. In further embodiments, a sleek fishing lure replaces the sleeve. The member including the shaft and coil may be inserted into a tapered bore formed in the lure and retained by interference fit at the small end of the tapered bore. Alternatively, the member including the shaft and coil is attached to a pivot pin located within the lure, and an arc of pivot is enabled by slots formed in the lure.

9 Claims, 10 Drawing Sheets

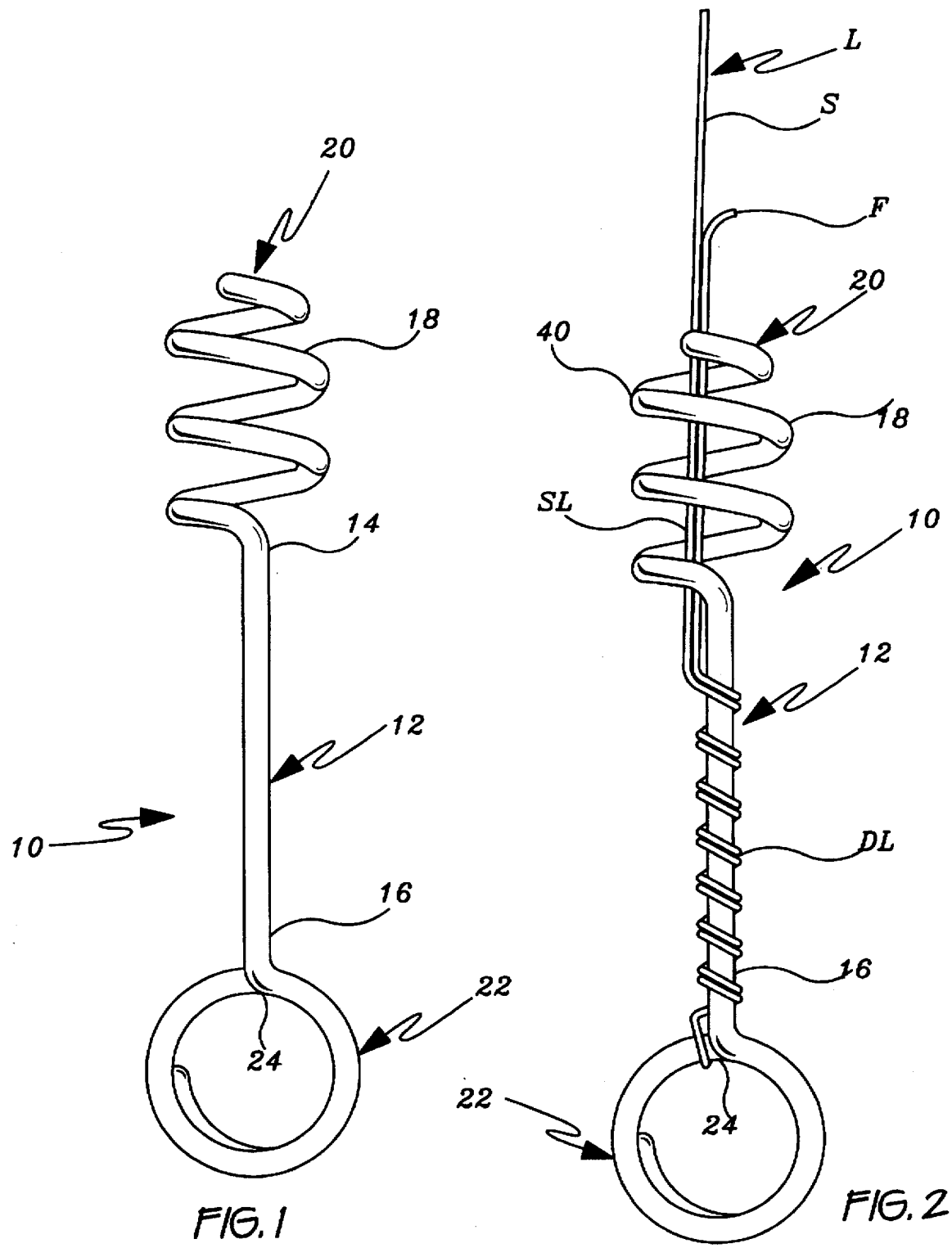

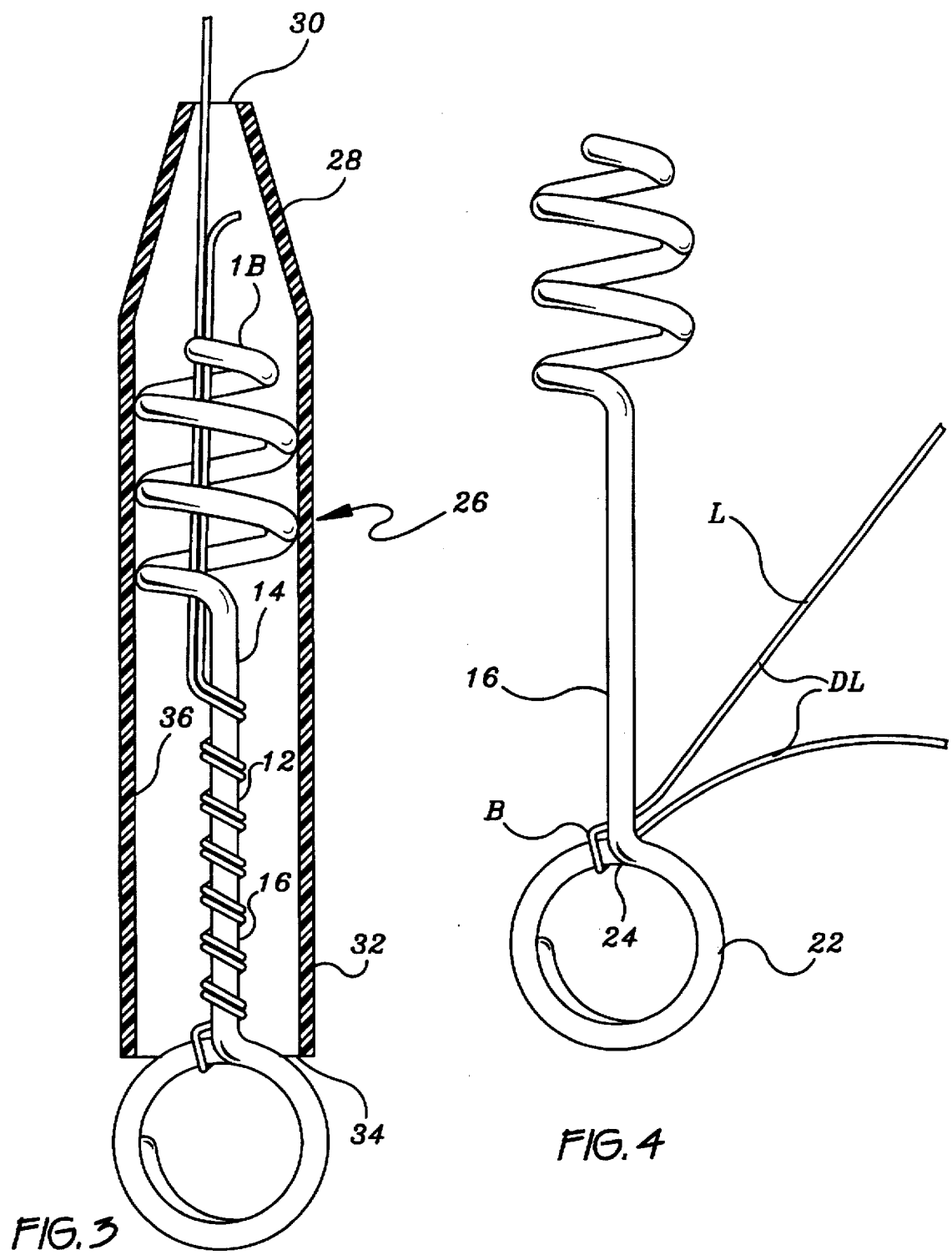

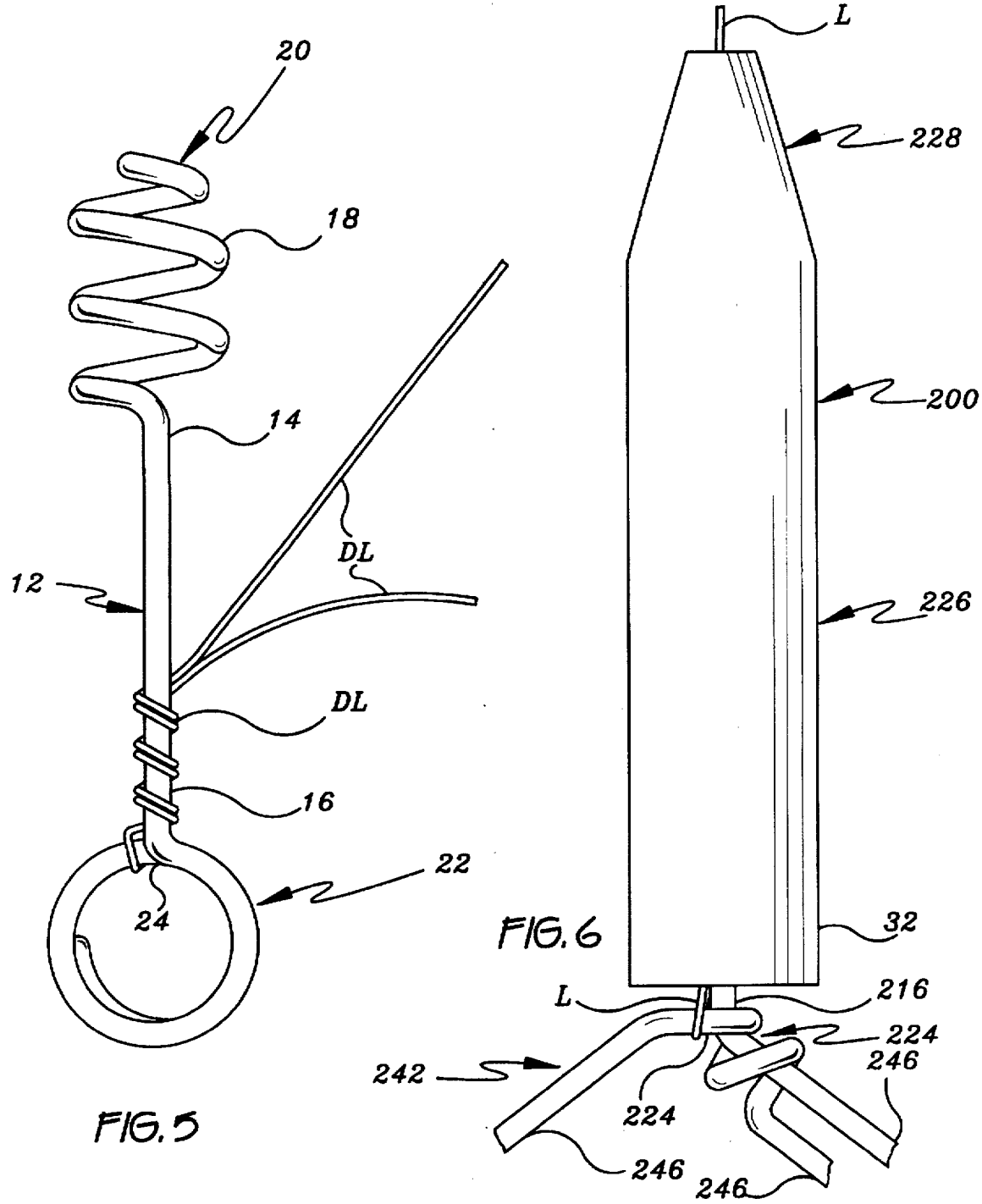

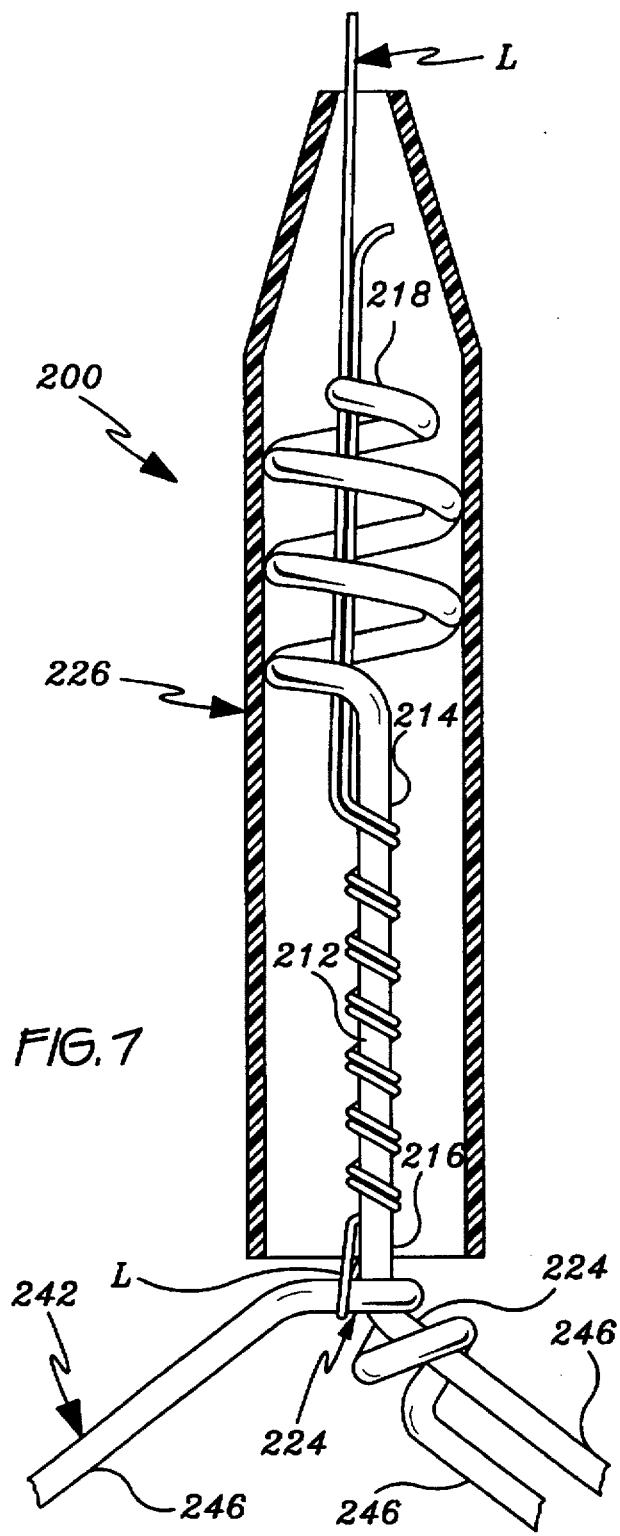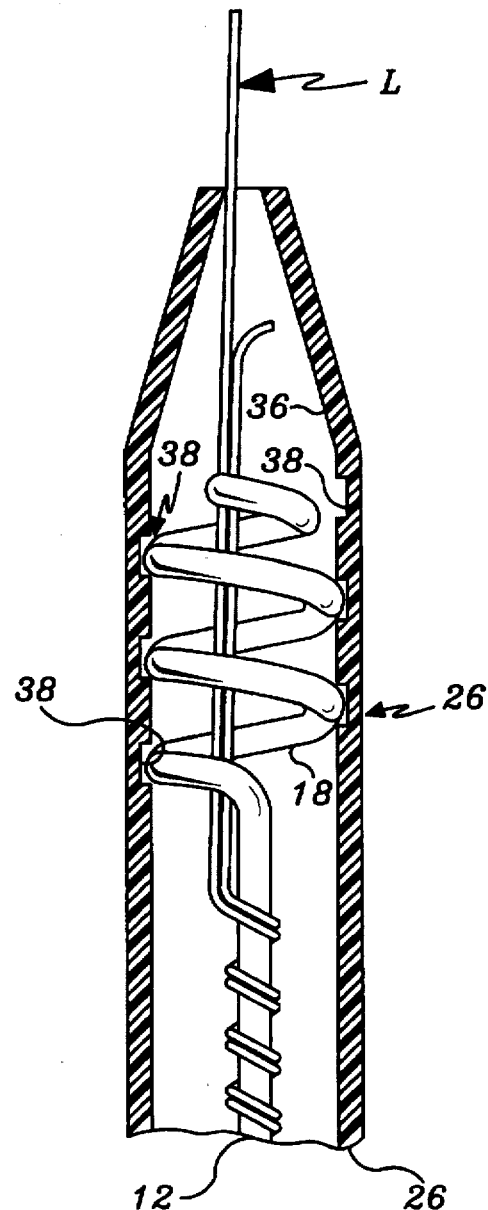

FISHING LINE LOCK

BACKGROUND OF THE INVENTION

1. Field of the Invention

The present invention relates generally to fishing tackle and more particularly to a releasable line attachment for the tackle.

2. Description of the Prior Art

Fishermen have long been frustrated by the process of attaching fishing line to tackle. A quick, convenient, yet reliable device for attaching tackle to and removing tackle from a fishing line is highly desirable to today's fisherman. Numerous situations arise, such as the parting of the line, the catching of the hook or lure on a snag, or the need to retie and discard abraded line, which situations would place such a device in great demand.

Fishermen have particularly sought a quick means of attachment which eliminates the need for the tieing of knots, since a number of problems are associated with the formation of knots and the introduction of knots in a line. One problem associated with the tieing of knots is the amount of hand agility required. For instance, persons with arthritic hands have diminished agility and consequent difficultly in tieing knots.

Additionally, the introduction of new high strength multifilament micro braided fishing line has increased the need for a device which would quickly yet reliably allow for the attachment of such line to the lure. One of the principal drawbacks of the new multifilament micro braided fishing line is its lack of knot strength. This lack of knot strength is so dramatic in the new lines that many manufactures recommend that glue be applied to the knot after it is tied to insure that the knot will not come loose. A device which would promote quick attachment of these new lines to lures without the introduction of elaborate knots into the line, without the use of glue, and without reducing the overall strength of the line itself is most desirable.

Even with monofilament and dacron braided lines, novice anglers and those who are not skilled in the art of knot tying may encounter problems attaching line to lure. Furthermore, low light conditions or attempting to tie knots in a rocking boat can cause frustrating problems even for the skilled angler.

Even when those problems associated with knot formation have been overcome, many other problems may occur as the result of introducing a knot into a line. The introduction of knots often reduces the strength of the line. Knots also tend to tighten with use and become increasingly difficult to remove. In the case of plastic monofilament lines, and particularly with the new multifilament, microbraided lines, it is difficult to tie knots that will hold. Many knots that are perfectly satisfactory for use with one type of line unravel if tied with another type of line.

The prior art includes a number of attachment devices which have attempted to address some of the problems described above. Some of these attachment devices include fishing line sinkers, hook attachment devices, and line release devices.

However, all prior art devices file to provide simultaneously a means for quickly attaching and removing line to lure; means for attachment which is secure and which does not create a weak point in the line; means for attachment which which is not bulky and which therefore does not adversely affect the natural action of the lure; means for attachment which is streamlined and thus allows the lure to track straight in the water; means for attachment which does not provide a surface prone to snagging weeds, rocks, underwater limbs, and like projections; means for attachment which incorporates a sleeve which acts to reduce turbulence as the lure travels through the water, and which prevents the line attached to the device from unraveling; and means for attachment which may be selectively attached to an existing lure or incorporated integrally with most new lure designs.

U.S. Pat. No. 1,248,608, issued to Calvin S. Brown on Dec. 4, 1917, discloses a Bottle-Opener which includes a handle and a transverse member. An extractor in the form of a screw is pivotally mounted on the transverse member.

U.S. Pat. No. 1,883,574, issued to J. S. Cleeland on Oct. 18, 1932, discloses a Sinker which includes a body of streamline form, and a pair of coil springs extending axially from opposite ends of the body.

U.S. Pat. No. 2,482,721, issued to A. R. Sigmundi on Sep. 20, 1949, discloses a Bait-Retainer For Fishhooks which includes a hook attached to one end of a shank which has an eye at its second end. Integral with the eye is a second shank which has, at a end opposite the eye, a coil.

U.S. Pat. No. 4,060,927, issued to William A. Haun et al. on Dec. 6, 1977, discloses a fish sinker which includes a lead weight and a length of stainless steel wire. The lead body of the sinker is elongated in shape and tapers from its center toward each opposite end. Each opposite tapering end has a wire coil extending therefrom. The length of wire is threaded through the coils at each end.

U.S. Pat. No. 4,217,721, issued to Welcome D. Hershberger on Aug. 19, 1980, discloses a weed shield attachment for use with a conventional fishhook. The weed shield attachment is a unitary structure which has a sleeve that can be fitted onto the stem of the fishhook. A bulbous skirt is integrally connected to the sleeve at the forward end thereof.

U.S. Pat. No. 4,361,977, issued to Michael J. Lawler on Dec. 7, 1982, discloses an Attachment Apparatus which includes a helical member having a continuum of coaxial helixes disposed in spaced longitudinal relation. The continuum of coaxial helixes defines an axial aperture that is adapted to receive an external connecting device such as a line or anchor pin. An elastic core is disposed within the aperture in frictional engagement with at least one of the helixes.

U.S. Pat. No. Design 107,418, issued to John E. Ganaway on Dec. 14, 1937, discloses a Fishing Sinker having a spiral form.

U.S. Pat. No. Design 250,656, issued to L. Fred Raney on Dec. 26, 1978, discloses a Fishing Line Retainer which includes plate having a coil extending from one end and a hook member extending from an opposite end.

Great Britain Patent Specification No. 690,469, published Apr. 22, 1953, discloses an improvement to leads for removable attachment to fishing lines. The device of the '469 patent specification includes a weight with wire attachment members in the form of a complete loop or a ring with split or divided overlapping portions.

Canadian Patent No. 1,010,651, issued on May 24, 1977, disclosed a quick release fishing line attachment device. The attachment device includes an elongated shank having a upper end and lower end. A U-shaped hock extends from the lower end. A fishing line retaining loop is formed integrally with the upper end and spaced from the upper end of the elongated shank.

None of the above inventions and patents, taken either singly or in combination, is seen to describe the instant invention as claimed.

SUMMARY OF THE INVENTION

The present invention relates to a fishing line lock device or line attachment device which includes a shaft having a first end and second end, a coil member extending from the first end of the shaft, an anchor member attached to the second end of the shaft, and a sleeve disposed around the shaft and coil. The sleeve is secured in position by frictional engagement between an inner surface of the sleeve and the coil. The coil defines an axial aperture adapted to receive a portion of line.

In a preferred embodiment, the anchor member comprises a ring extending from the second end of the shaft. In using the preferred embodiment, a portion of line is looped through the ring to form a double line portion. The double line portion is then wrapped spirally upward in the same direction as the spiral of the coil. A straight portion of the double line extends through the axial aperture of the coil. The single line extends from the coil member in straight line fashion, essentially along the same axis as the shaft, allowing the device to track straight in the water when pulled by the user. The ring also serves as an attachment point for standard straight line lures and hooks.

The sleeve may have a tapered end which enhances the ability of the device to track straight in the water. The sleeve also serves to reduce turbulence as the line is pulled through the water. The sleeve further serves to prevent the line attached to the device from unraveling from the shaft and prevents the tangling of weeds in the device. An alternative embodiment of the sleeve includes a spiral groove formed internally of the sleeve, in which the coil portion is threaded for enhanced securement of the sleeve around the coil and shaft.

Another alternative embodiment of the sleeve is one in which the sleeve is weighted. This allows the sleeve to serve an additional function in sinking the lure to a desired depth.

In an another embodiment of the device, the anchor member includes first and second wire members which extend from the second end of the shaft. Any number of fishing lures may be integrally attached to the end portions of the first and second wire members. For instance a spinner blade (not shown) may be attached to the first wire member, with a lure body and hook (not shown) attached to the second wire member.

In another embodiment, the device may be inserted into the body of the lure itself. This embodiment does not require a sleeve since the lure body essentially serves the same purposes as the sleeve. Additionally, this embodiment allows means of securing the line internally within the body of the lure itself so that there are no external knots, rings, swivels, or other visible attachments which might discourage a wary fish.

Once the user attaches a line to the attachment device of the preferred embodiment or alternative embodiment, the line will not slip and should under most conditions exceed the break point of any standard knot which might have been used.

The attachment device may be manufactured as an integral portion of a fishing lure or sold as an after market product for incorporation into existing lure and hook designs.

Accordingly, it is one object of the invention to provide a line attachment device which allows quick, convenient, secure attachment of line to lure.

It is another object of the invention to provide a line attachment device having a shaft with a coil on one end and a anchor member at an opposite end, whereby the device may travel straight through the water when pulled on a line by the user.

It is an additional object of the invention to provide a line attachment device which includes a sleeve member which prevents unravelling of line attached to the device and enhances the ability of the device to track straight through the water.

It is again an object of the invention to provide a line attachment device which eliminates any surface that could snag weeds, rocks, underwater limbs, and like projections.

A still additional object of the invention is to provide a line attachment device which is compact and does not adversely affect the natural action of the lure.

It is a further object of the invention to provide a line attachment device which allows for the integral attachment and incorporation of existing lure and hook designs.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1 is a front elevational view showing the line attachment device of the present invention.

FIG. 2 is an front elevational view showing a line secured to the line attachment device.

FIG. 3 is front elevational view showing a sleeve surrounding the shaft and coil of the line attachment device with the sleeve shown in cross section.

FIG. 4 is a front elevational view showing a portion of line looped around the anchor point of the line attachment device.

FIG. 5 is a front elevational view showing a double line portion partially wrapped around the shaft of the line attachment device.

FIG. 6 is a front elevational view of a second embodiment of the line attachment device of the present invention.

FIG. 7 is a front elevational view of the second embodiment with the sleeve shown in cross section.

FIG. 8 is a front elevational view showing a second embodiment of the sleeve member.

Similar reference characters denote corresponding features consistently throughout the attached drawings.

DETAILED DESCRIPTION OF THE PREFERRED EMBODIMENTS

Figure 9:
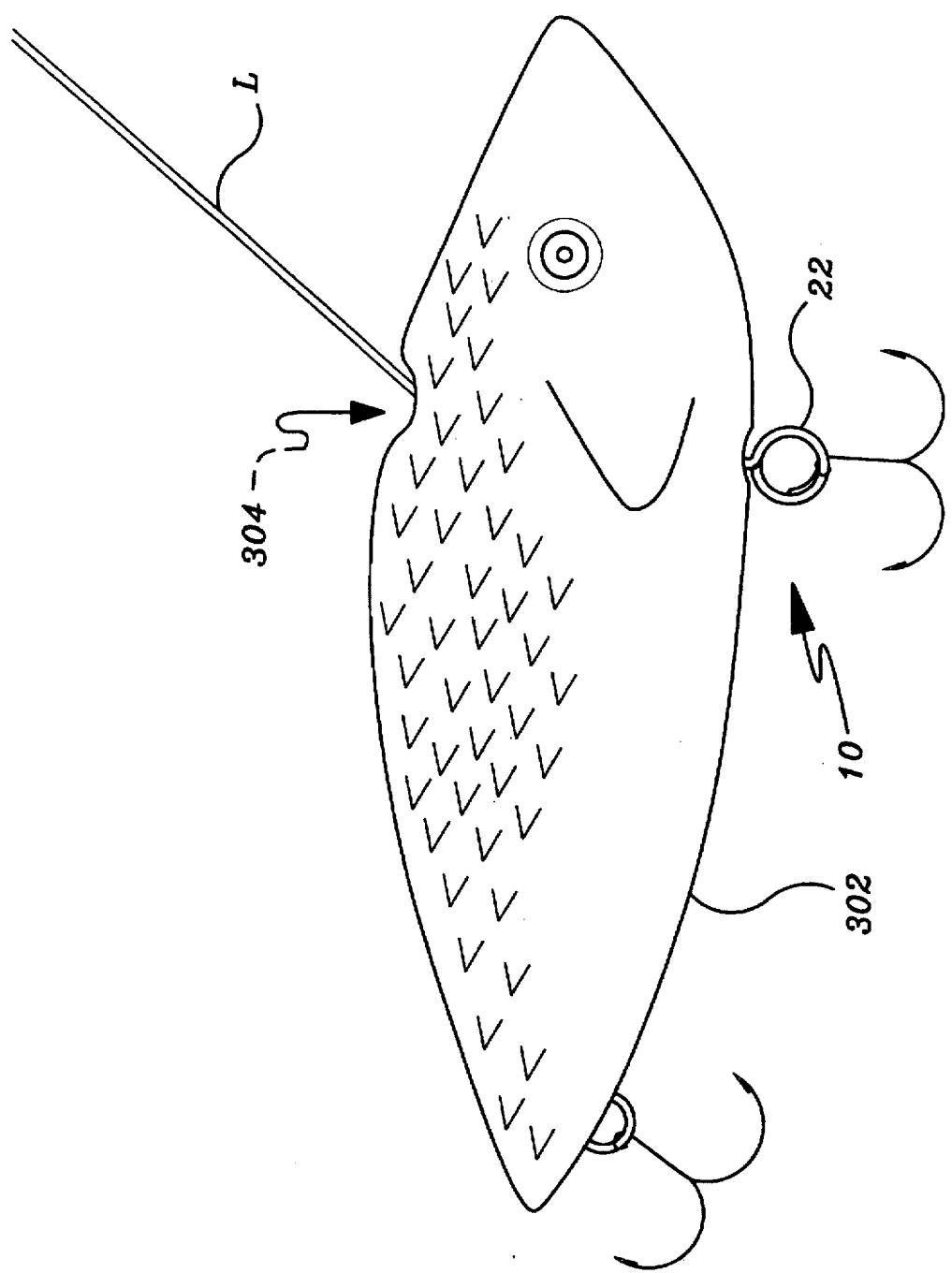
FIG. 9 is a side elevational view of the line attachment penetrating a vertical bore formed in a lure to enable cooperation between line attachment and lure, drawn to enlarged scale.

A line lock device or line attachment device 10 according to the present invention is shown in FIGS. 1–3. The device 10 includes a shaft 12 having a first end 14 and a second end 16. A coil member 18 extends from the first end 14 of the shaft 12. The coil member 18 defines an axial aperture 20 which extends through the coil member 18. The coil member 18 is adapted to receive a line L as shown in FIG. 2. A ring 22 extends from the second end 16 of the shaft 12 and is integral thereto. The ring 22 is disposed in a common plane with the shaft 12. As discussed in greater detail below, the ring 22 provides both as an anchor point 24 for an attached line and a connection point for fishing lures and hooks.

As shown in FIG. 3, a cylindrical sleeve 26 may surround both the shaft 12 and the coil member 18. The sleeve 26 has a tapered first sleeve end 28 adjacent the coil 18. The tapered first end 2S includes an opening 30 to the interior of the sleeve 26. The opening 30 is adapted to receive a standard fishing line. Opposing the first sleeve end 28 is a second sleeve end 32 having an opening 34 therein. The second sleeve end 32 is adjacent the second end 16 of the shaft 12. An inner surface 36 of the sleeve 26 frictionally engages the coil member 18. As shown in FIG. 8, the inner surface 36 may include a spiral groove 38 conforming to the coil member 18. The coil member 18 is disposed within the spiral groove 38 to secure the sleeve 26 in place around the coil 18 and shaft 12.

In FIG. 2, 4, and 5, the method and technique of using the line attachment device 10 is illustrated. As shown in FIG. 4, a length of line L is threaded through the ring member 22 and doubled to form a bight B and a doubled length of line DL. The bight B engages an anchor point 24 defined by the point at which the ring 22 and shaft second end 16 connect. As shown in FIG. 5, the doubled line DL is spirally and upwardly wrapped around the shaft 12 in the same direction as the spiral of the coil 18. As shown in FIG. 2, the doubled line DL is finally wrapped around the coil portion 18, resulting in a straight line portion SL which extends through the axial aperture 20 of the coil 18. The double line DL terminates to a free end F and a single line S. The free end F may be trimmed even with the top 40 of the coil 18. The single line S connects to a fishing rod. The doubled line DL frictionally engages itself and the shaft 12 substantially to prevent the unravelling of the line from the shaft. The axial aperture 20 of the coil 18 maintains the free end F and single line S in close proximity to one another and thus further prevents the unravelling of the line L from the line attachment device 10. Once the line L has been secured to the attachment device 10, a standard straight line lure (not shown) may be secured to the ring member 22. The line is easily disconnected from the attachment device 10 by unwinding the single line portion S.

Referring now to FIG. 3, when the sleeve 26 is used with the lock line device 10, the single line S is threaded through the second end opening 34 of the sleeve 26 and out through the first end opening 30. The sleeve 26 is then secured over the coil 18 and shaft 12, with the coil 18 frictionally engaging the inner surface 36 of the coil 18.

The sleeve 26 may be constructed from rubber surgical tubing or a plastic material, preferably a flexible plastic material. The exterior of sleeve 26 may also be constructed of metal with a rubber or plastic interior. This construction would increase the density of sleeve 26, which could then be employed as a weight for sinking the lure to a desired depth. The shaft 12 and coil 18 are typically constructed from a hard plastic or metal.

A second embodiment of the line attachment device 200 is shown in FIG. 6 and 7. The line attachment device 200 of this embodiment includes a shaft 212, a coil member 218 attached to a first end 214 of the shaft 212, and a tapered sleeve member 226 surrounding the coil member 228 and the shaft 212. A first wire member 242 and second wire member 244 extends from a second end 216 of the shaft 212. Any number of fishing lures may be integrally attached to the end portions 246 of first and second wire members 242,244. For instance a spinner blade (not shown) may be attached to the first wire member, with a lure body and hook (not shown) attached to the second wire member. The junction between the first wire member 242 the second end 216 of the shaft 212 provides an anchor point 224 for attachment of a line. A line L may be attached to the device 200 in a manner similar to that described for the line attachment device 10 of the preferred embodiment.

Figure 10:
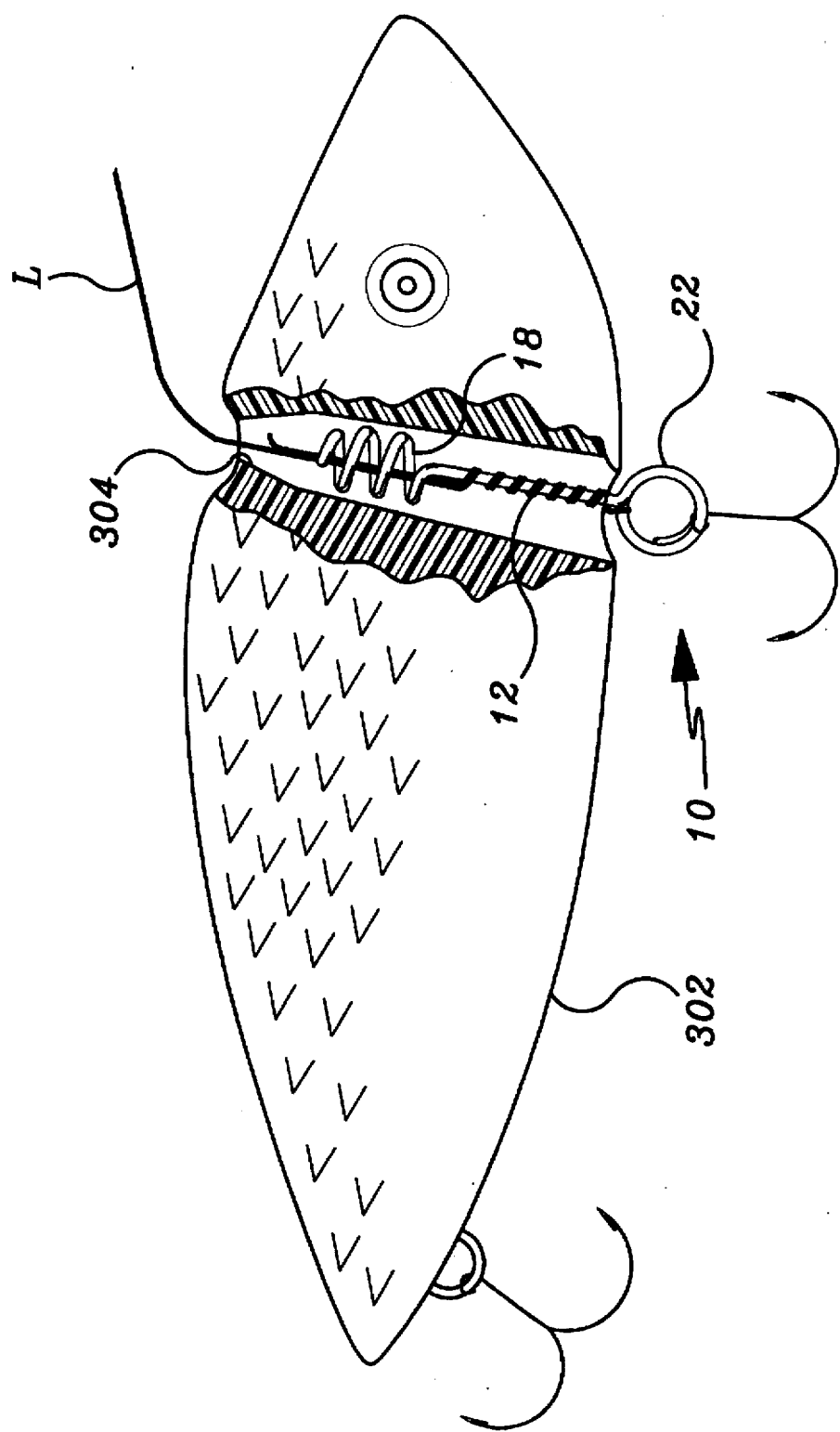
FIG. 10 is a side elevational view corresponding to FIG. 9, partially broken away to reveal internal detail.

Another embodiment of the line attachment device is shown in FIGS. 9 and 10. Line attachment device 10 of this embodiment includes a shaft 12, a coil member 18 attached to the first end 14 of shaft, and a lure 302 including a bore 304 tapered at one end and open at the other end. Bore 304 is arranged vertically with respect to the body of lure 302, and line attachment device 10 is inserted into lure 302 from the bottom, prior to attachment of a line L. Lure 302 is thus retained on line L by interference fit. Line attachment device 10 is inserted into bore 304. The lower end of bore 304 is of diameter less than that of ring member 22, so that once device 10 is inserted into lure 302, it is retained in place by interference fit at the bottom. Gravity will prevent lure 302 from riding upwardly on line L.

Optionally, line attachment device 10 is further secured within bore 304 by frictional engagement, screw threads (not shown), or by spring clamps (not shown).

In this embodiment, no sleeve is required since the sleek lure body serves in its place. Line L is attached to device 10 in a manner similar to that described previously.

Figure 11:
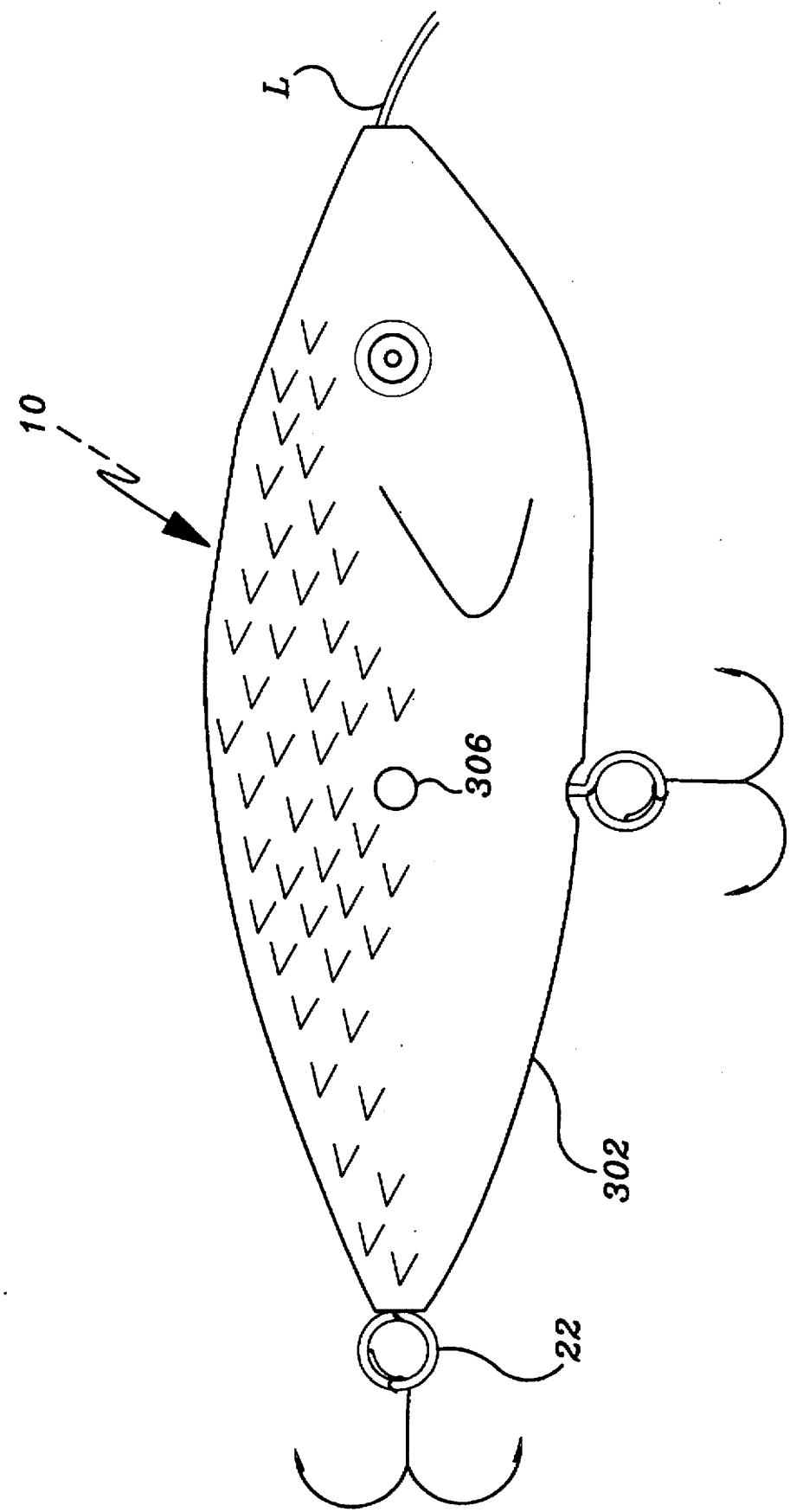
FIG. 11 is a side elevational view of the line attachment cooperating with a lure, wherein the line attachment is oriented longitudinally within the lure.
Figure 12:
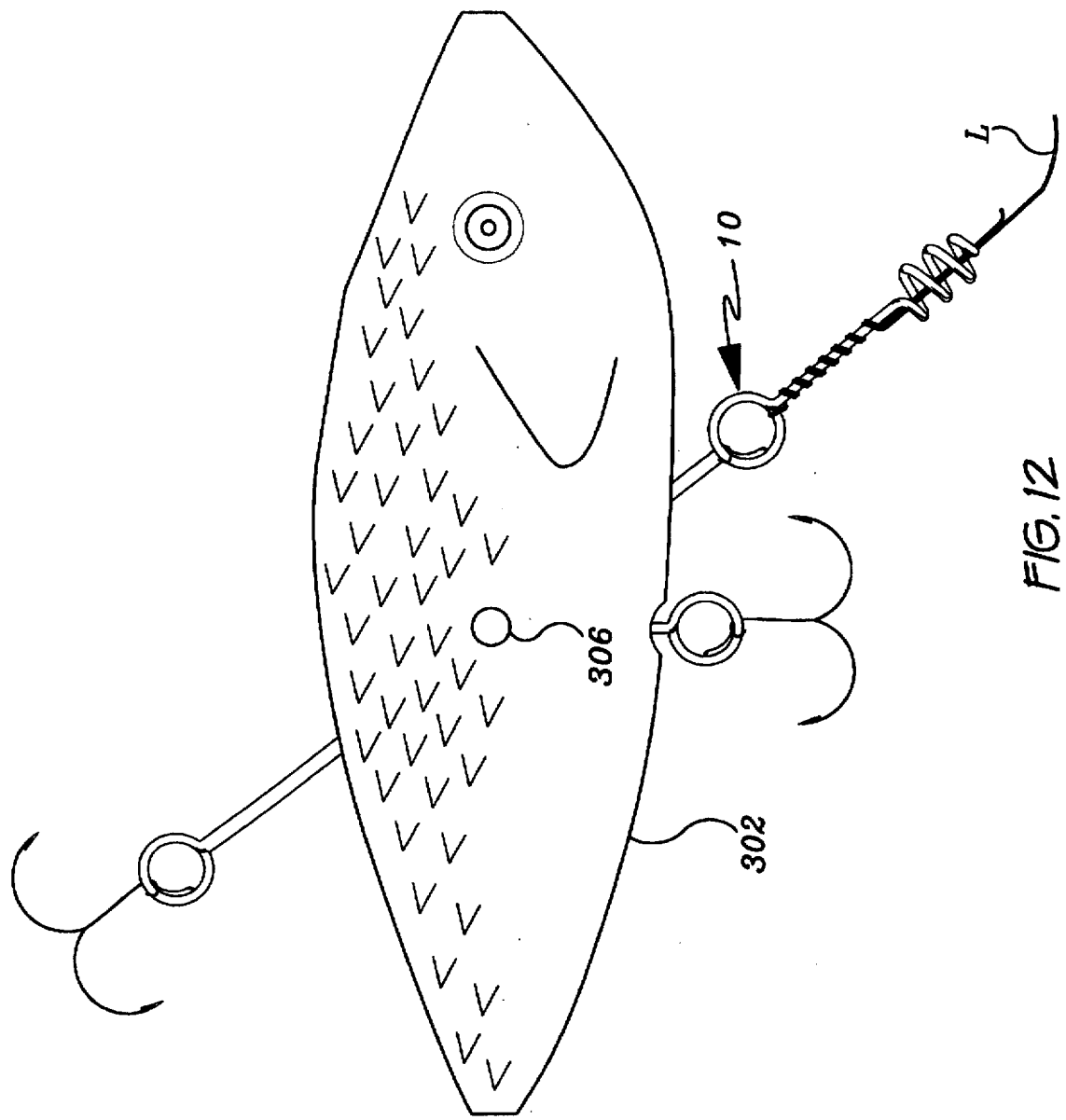
FIG. 12 is a side elevational view of the line attachment pivotally fixed within a lure.
Figure 13:
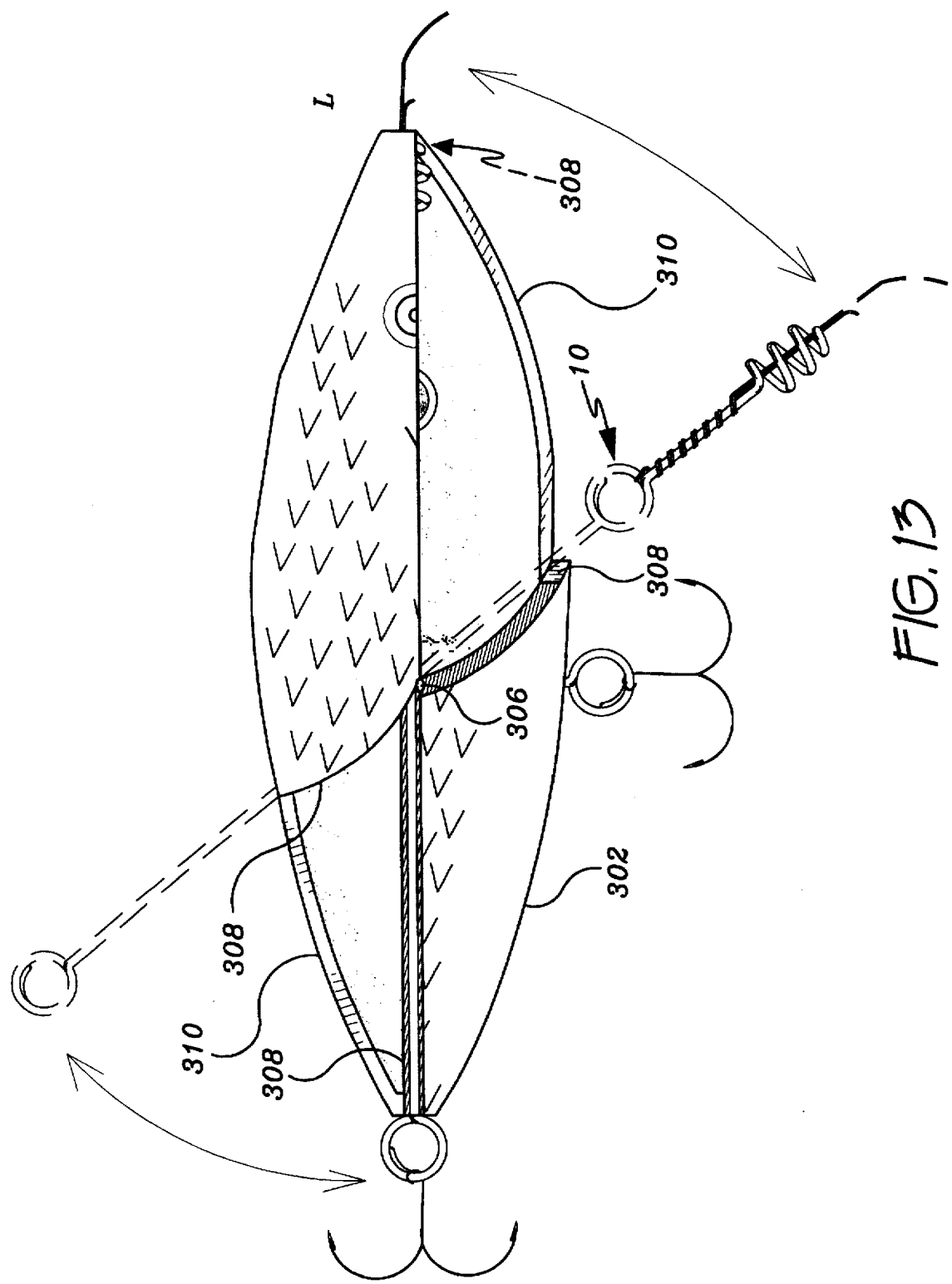
FIG. 13 is a side elevational view generally corresponding to FIG. 12, but partially broken away to reveal internal detail.

Still another embodiment is shown in FIGS. 11, 12, and 13. In this embodiment, line attachment device 10 extends longitudinally through the body of lure 302 and a hole in device 10, and is secured therein by a pin 306 extending laterally within lure 302. Device 10 is pivotally attached to lure 302 at pin 306. Alternative constructions of device 10 are illustrated in FIGS. 11 and 12.

The body of lure 302 is slotted to accommodate arcuate motion of device 10 during pivot, this being illustrated in FIG. 13. Slots 310 are bounded by walls 308, which serve to limit travel or pivot of device 10 with respect to the body of lure 302.

Figure 14:
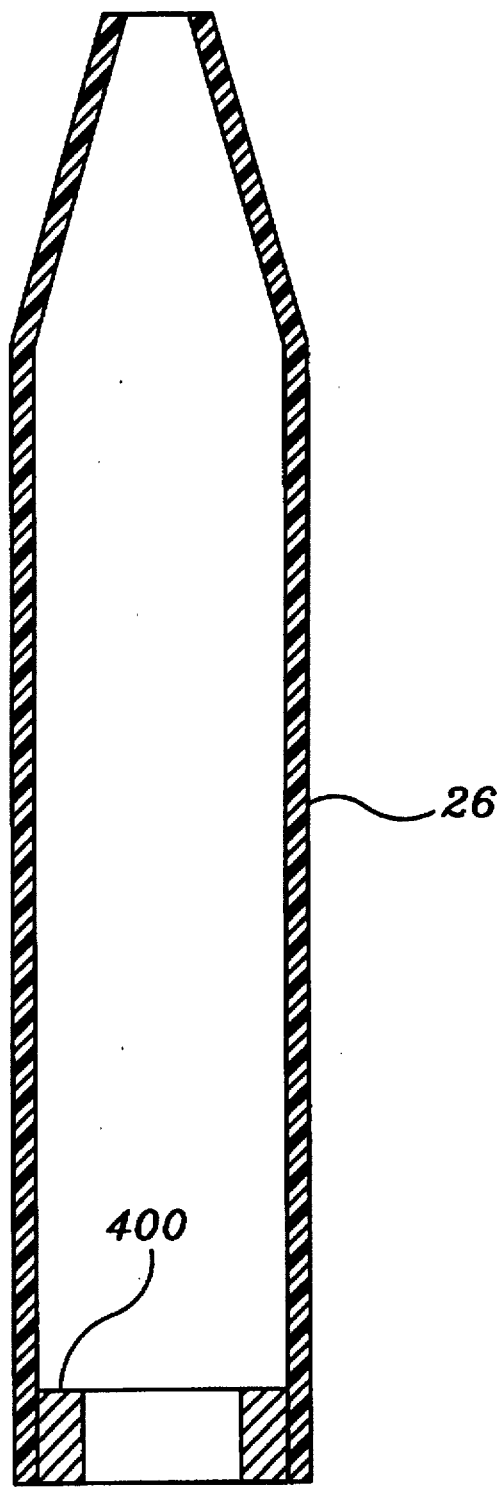
FIG. 14 is a cross sectional, side elevational view of a sleeve illustrating an alternative embodiment incorporating a separate weight.

FIG. 14 illustrates another embodiment of sleeve 26, wherein a weight 400 is secured thereto, in order to impart weight causing sleeve 26 to sink lure 302. Sleeve 26 may be formed entirely or partially of metal or any suitable material of greater density than that of water, so that device 10 will sink in water, rather than having weight 400 attached as shown in this FIG.

It is to be understood that the present invention is not limited to the embodiments described above, but encompasses any and all embodiments within the scope of the following claims.

What is claimed is:

1. A line attachment device comprising:
   a straight shaft having a first end and a second end;
   a coil member extending from said first end of said shaft, said coil member defining an axial aperture therethrough, said axial aperture adapted to receive a line;

an anchor member integrally connected to and extending from said second end of said shaft; and a sleeve disposed around said shaft and said coil member, said sleeve having a first sleeve end and a second sleeve end, said first sleeve end adjacent said coil, said second sleeve end adjacent said second end of said shaft, and said sleeve having an inner surface with a spiral groove threadedly engaging said coil member.

2. The line attachment device according to claim 1, wherein said sleeve first end is tapered.

3. The line attachment device according to claim 1, wherein said anchor member includes a coiled ring having an overlapping section to allow for the securement of a lure.

4. The line attachment device according to claim 1, wherein said anchor member includes a pair of wire members for attachment of lures and hooks.

5. The line attachment device according to claim 1, said sleeve being of greater density than water, whereby a lure attached to said line attachment device sinks to a desired depth.

6. A line attachment device comprising:

a straight shaft having a first end and a second end;

a coil member extending from said first end of said shaft, said coil member defining an axial aperture therethrough, said axial aperture adapted to receive a line;

an anchor member attached to said second end of said shaft; and a cylindrical sleeve disposed around said shaft and said coil member, said sleeve having a tapered first sleeve end with a opening therein, said first sleeve end adjacent said coil, said opening of said first sleeve adapted to receive a line, and a second sleeve end having an opening therein, said second sleeve end adjacent said second end of said shaft, and said sleeve having an inner surface with a spiral groove threadedly engaging said coil member.

7. The line attachment device according to claim 6, said sleeve being of greater density than water, whereby a lure attached to said line attachment device sinks to a desired depth.

8. The line attachment device according to claim 7, wherein said anchor member includes a coiled ring having an overlapping section to allow for the securement of a lure.

9. The line attachment device according to claim 7, wherein said anchor member includes a first wire member for attachment of lures and hooks and a second wire member for attachment of lures and hooks.

* * * * *